April 25, 1961

E. C. BROXON 2,981,844

ANALOG-TO-DIGITAL ENCODER

Filed Dec. 20, 1955

Inventor
Errett C. Broxon
By Alvin W. Graf
Attorney

April 25, 1961  E. C. BROXON  2,981,844
ANALOG-TO-DIGITAL ENCODER
Filed Dec. 20, 1955  2 Sheets-Sheet 2
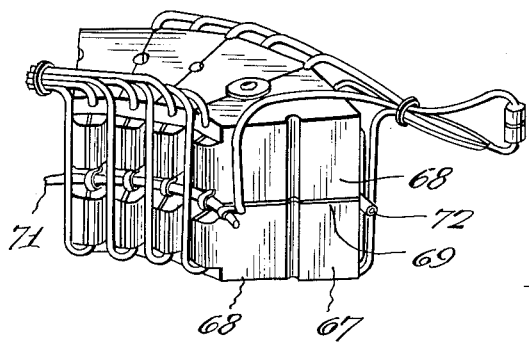
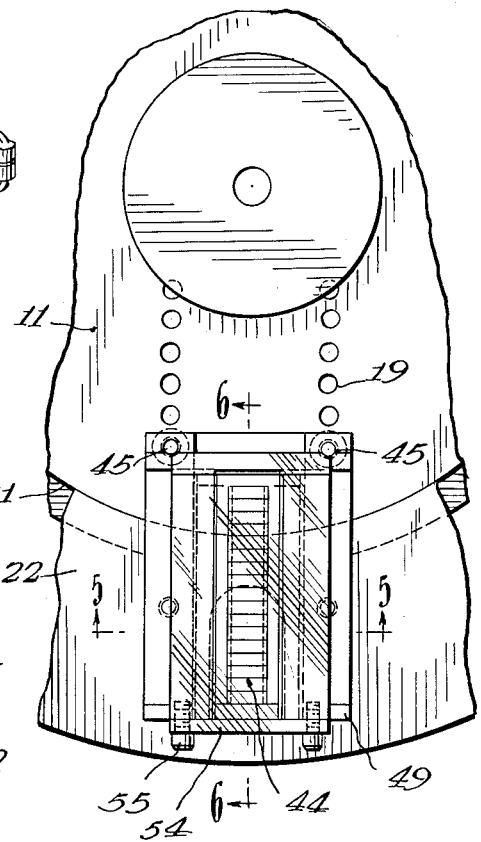
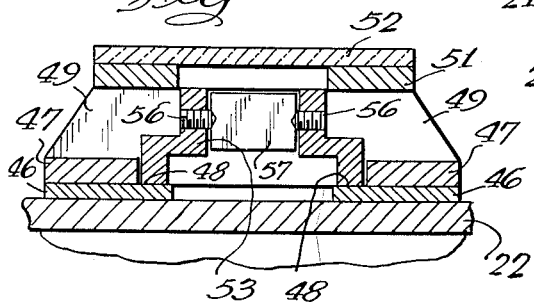
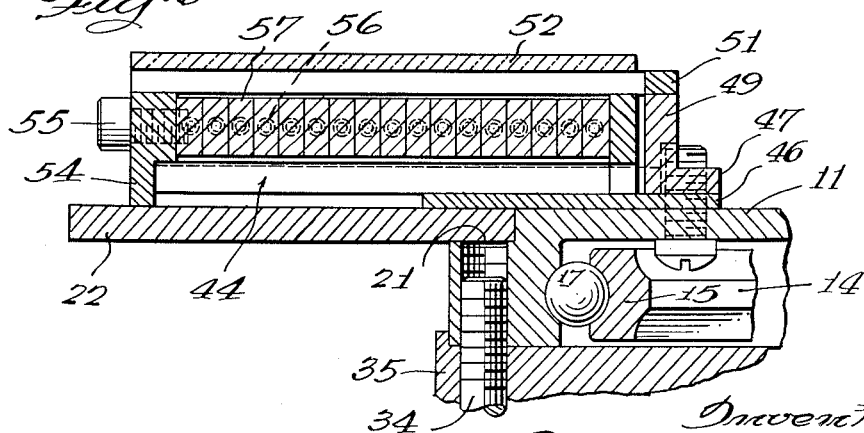
Inventor
Errett C. Broxon
By Alois W. Graf
Attorney

United States Patent Office 2,981,844
Patented Apr. 25, 1961

2,981,844

ANALOG-TO-DIGITAL ENCODER

Errett C. Broxon, Cincinnati, Ohio, assignor to The Baldwin Piano Company, Cincinnati, Ohio, a corporation of Ohio Filed Dec. 20, 1955, Ser. No. 554,156

5 Claims. (Cl. 250—219)

The present invention relates to analog-to-digital encoders, and more particularly to precision type encoders having from twelve to twenty digits.

In the manufacture of analog-to-digital encoders there are a number of problems encountered, and it is desired to make the device relatively compact and yet at the same time meet certain specifications as to accuracy. Heretofore, several types of encoders have been devised which encountered some concentricity problems and wherein the code disc was subject to wobble. It also was found that previous embodiments did not readily withstand shock. In accordance with the present invention, certain of the problems encountered by prior constructions have been solved or minimized by a novel arrangement wherein a relatively large diameter of single row ball bearings is employed in a structure wherein several of the external surfaces are finished in the same machine operation, thereby insuring parallelism between the surfaces.

The encoders of the present invention were arranged to include transistorized reading heads to provide a maximum usefulness in a variety of data, transmission and computing systems. Such encoders should operate over a wide range of reading rates synchronized from an external programming source. These encoders were designed to provide parallel output signals of sufficient amplitude and width to operate into transistor or vacuum tube shift registers, magnetic flip-flops, or a cyclic to ordinary binary translator. In the embodiment of the present invention a unique wedge-shape polystyrene molded case transistor preamplifier was employed.

It, therefore, is an object of the present invention to provide an improved analog-to-digital encoder.

A further object of the invention is to provide a compact, highly accurate digital encoder.

Still another object of the invention is to provide an improved single bearing design for encoders.

A still further object of the invention is to provide an improved adjustable photocell assembly for encoders.

Other and further objects of the invention subsequently will become apparent by reference to the following description taken in conjunction with the accompanying drawings, wherein:

Figure 3 is a perspective view of the transistor amplifier assembly;

Figure 4 is a partial view showing the guide arrangement for the photocell assembly;

Figure 5 is a partial detailed view as seen in cross-section in the direction of the arrows along the line 5—5 of Figure 4; and Figure 6 is another cross-sectional view as seen in the direction of the arrows along the line 6—6 of Figure 4.

Figure 1:
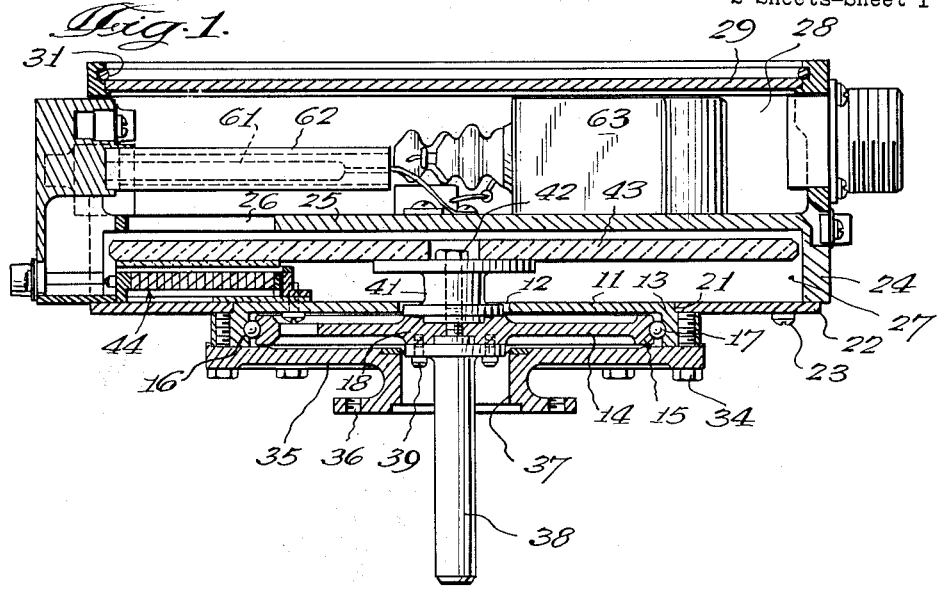
Figure 1 is a view of the encoder as seen in an axial cross-section.

A single bearing analog-to-digital encoder is illustrated in Figure 1 wherein a circular member 11, having a central aperture 12 and an annular flange 13, is arranged in cooperative relation to a second circular member 14, having a peripheral flange 15 concentrically disposed within the projecting annular flange 13 of the first circular member. The adjacent surfaces of the annular and peripheral members 13 and 15 are provided with annular concave grooves, races or tracks 16 for supporting a plurality of bearing balls 17 arranged in spaced relation about the periphery. The second circular member 14 has a central boss 18 having its upper surface adjacent the central aperture 12 of the first circular member 11.

One of the difficulties heretofore encountered in analog-to-digital encoders is the matter of concentricity and wobble of the code disc. To minimize these factors, the concentric concave races 16 are lapped in a machine. The balls 17 are oxidized and lapped and are of one-quarter inch in diameter. In one particular embodiment thirty-three balls of this diameter were employed where the outer diameter of the second circular member 14 was five inches. The balls were held to an accuracy of ±.000005 inch. The total clearance permitted between the balls and the two races 16 was .00005 inch, which therefore should not produce more than a tilt or wobble of the associated encoder disc amounting to .0001 inch at 2.5 inch radius.

To assure a minimum of wobble of the encoder disc of the upper surface of the first circular member 11, the upper and lower surfaces of the boss 18 are all ground in the same machine operation when the races are lapped. At the same time a plurality of spaced pairs of guide holes 19 are drilled parallel to a radius of the circular member 11 which are illustrated in Figure 4. The guide holes 19 of each pair are at equal distances from the radius and on opposite sides thereof in order to assure proper alignment of an assembly of photosensitive devices or photoresponsive transistors. For a given size code disc, only one pair of guide holes is used to mount the photocell array, as will be apparent from Figure 4 and hereafter. By performing all of these machine operations in a single setup there is a minimum probability of mechanical error causing a reduction in the ultimate desired accuracy of the entire encoder.

During the same machine operation heretofore referred to, an annular recess 21 is formed adjacent the top surface of the circular member 11 to receive a plate 22 which is secured by suitable screws 23 to a casing 24. The casing 24 has a central partition 25 provided with an aperture 26 to provide a compartment 27 for housing the code discs and the photosensitive elements. Another housing or chamber 28 is formed on the other side of the partition 25 which may be closed by a cover 29 retained in position by a suitable snap ring 31. The compartment 27, as may be seen from Figure 2, may be provided with a plurality of partitions 32 and 33 to divide the compartment into smaller units; one of which is to hold in a shielded relation a transistor amplifier, another of which holds in shielded relation a transformer and ignition circuit for a light source, and the other remaining portion of the compartment being provided for certain electrical connections extending to the photosensitive transistor assembly.

The annular flange 13 of the first circular member 11 is provided with suitable threaded apertures for receiving a plurality of cap screws 34 which hold in position an adaptor mounting casing 35 which is so designed as to be secured to a cooperating apparatus by suitable fastening means extending through threaded apertures 36. The casing 35 has a central aperture or bore 37, through which extends a shaft 38 having a flange secured by a plurality of cap screws 39 to the underside of the boss 18 of the second circular member 14.

The upper surface of the boss 18 of the second circular member 14 carries a coaxial code disc hub support 41 which is held in position by a cap screw 42 which enters an axial threaded bore in the shaft 38. Mounted upon the code disc hub support 41 is a code disc 43. Adjacent the left edge of the code disc 43 in Figure 1, there is shown a phototransistor assembly 44.

The phototransistor assembly 44 is shown in further detail in Figures 4, 5 and 6. To provide an accurate means for holding and guiding the transistor assembly along a radius of the first circular member 11, a plurality of holes 19 have been arranged to be engaged by suitable screws passing through a pair of holes 45 formed in the two parallel plate members 46 and 47. The two plate members 46 and 47, as may be seen in Figure 5, form ways 48 for guiding a cooperative structure. Mounted on the ends of the members 46 and 47 are vertical support members 49, which in turn carry an apertured plate 51 which supports a glass element 52 coated on one side with an opaque material, such as silver plate, and which has a slit engraved therein. The slit for a twenty digit encoder is substantially five microns wide. This slit is determined by taking into account the quantum width determined by the inner track of the code disc 43 which is at a radius of about 2.44 inches. A figure of sixty percent of the quantum is arbitrarily selected so that as much light as possible could be received on the photocells through the slit, while at the same time keeping to a minimum the error contributed by the finite slit width.

Mounted within the ways 48 is the assembly 44 of photocells, or phototransistors, carried by a carriage 53 having an end plate 54 secured thereto, as may be seen in Figure 4, which is locked in position by a plurality of cap screws 55 entering apertures in one of the end plates 49. The carriage 53 is provided on each side by a plurality of set screws 56 which engage the individual elements 57 in the form of phototransistors. It will be noted that in Figure 6 seventeen phototransistors are arranged in the assembly, sixteen being employed for different circles on the code disc, and the seventeenth being employed for reference purposes. In the event the code disc has a lesser number of tracks, a lesser number of photosensitive elements 57 are used, and the assembly 44 is mounted by one of the pairs of holes 19 radially inward to that illustrated in Figure 4.

I do not wish to be limited herein to the particular assembly of phototransistors illustrated. I may wish to employ an array of photocells comprising a base plate, such as glass, having deposited thereon a metallic pattern for connections to photocell units which may be in the form of small areas of photoconductive material deposited on the base in such a manner as to be provided connections by the metallic deposits. These connections may be of the form sometimes referred to in the current literature as "printed circuits." An example of such an array is illustrated in a copending application, Serial No. 530,570, filed August 25, 1955, in the names of Edward M. Jones and Wesley Love, entitled Photoelectric Musical Instruments and the Like, and assigned to the assignee of this application.

The upper surface of the member 52 is located about .0003 of an inch from the code disc 43. The wobble was held to within less than .0002 of an inch, and hence there is no danger of scratching either the surface of the member 52 or the code disc 43 due to an accumulation of dust particles between these two members.

Figure 2:
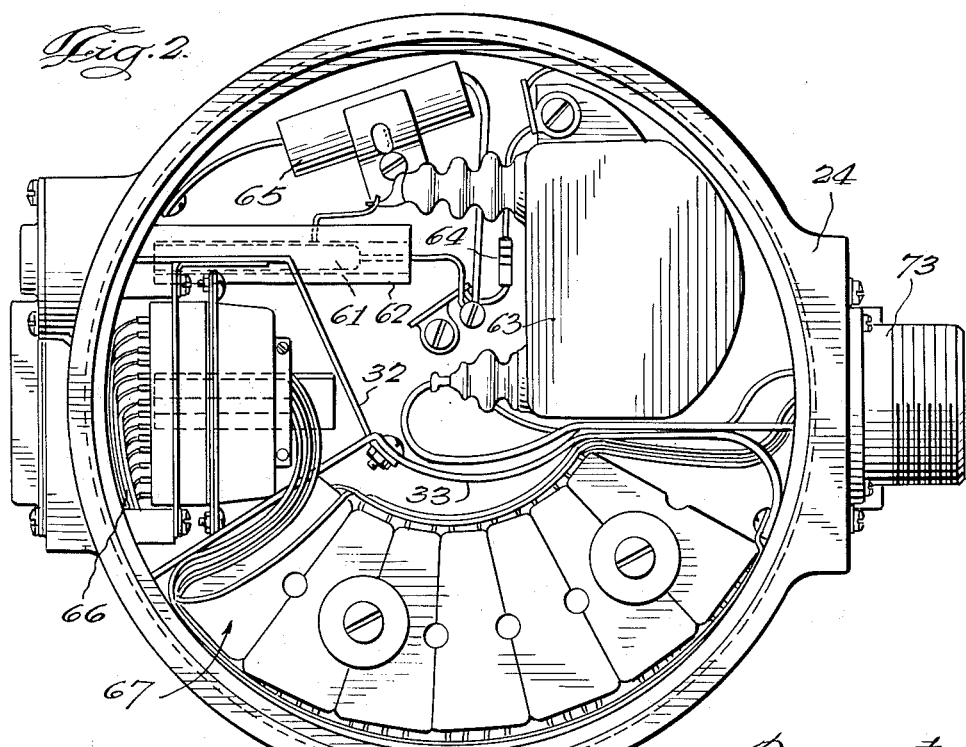
Figure 2 is a top view of the encoder shown in Figure 1 with the cover removed.

Light from a lamp 61 is directed by a mirror 62 through the aperture 26 of the partition 25 of the housing 24 to the code wheel 43. Light thereupon passes through the different circles of the code wheel 43, which are alternately light and dark, and through the slit of the member 52 to impinge upon certain of the phototransistors 57. The lamp 61, as may be seen from Figure 2, is pulsed by a potential derived from a transformer 63. One terminal of the lamp 61 is connected through a resistor 64 to the housing 24, and is also connected to a capacitor 65 which likewise is connected to the housing 24.

Suitable connections are provided between the phototransistors of the assembly 44 by means of wires and connectors 66 to an assembly of transistor amplifiers 67. The transistor amplifiers 67 are also shown in perspective in Figure 3. Each of the preamplifier stages of the assembly 67 is enclosed in a wedge-shaped polystyrene molded case 68. It will be noted from Figure 3, that two layers of the cases 68 are arranged with suitable connections thereto, and that the upper layer is separated from the lower layer by a metallic shield member 69. By soldering the amplifier units to B+ and B—, bus bars 71 and 72, and providing groups of input and output leads, there is obtained an assembly package for insertion into the compartment provided by the partition 33 of the casing 24. A suitable multicontact terminal outlet 73 is connected to one side of the casing 24 so that connections may be made to an auxiliary programmer and power supply assembly. The power assembly provides an anode voltage for the lamp 61 which is of the Type S413 Sylvania Strobotron. The anode voltage for this Strobotron is six hundred volts at approximately fifteen ma. The power supply also provides twenty-seven volts for the B+ of the preamplifiers shown in Figure 3 at approximately three hundred milliamperes. Bias is also supplied for the phototransistor assembly 44. All of these potential and current supplies are provided through the contacts of the plug unit 73.

While for the purpose of illustrating and describing the present invention certain specific embodiments have been illustrated in the drawings, it is to be understood that the invention is not to be limited thereby since such further embodiments and variations thereof are to be permitted as may be commensurate with the spirit and scope of the invention set forth in the accompanying claims.

I claim as my invention:

1. In a digital encoder the combination comprising a circular member having a central aperture and a projecting annular flange on one side, a second circular member parallel to said first member located within said annular flange, the peripheral edge of said second member and the adjacent annular flange of said first member being provided with concave bearing tracks, a plurality of balls located in said tracks to rotatably interconnect said two circular members, a coaxial code disc hub support carried by said second member on one side thereof and extending above the plane of its peripheral portion for holding a code disc parallel to the peripheral surface portion of said first member, guide means on the peripheral surface portion of said first member parallel to a radius thereof for mounting on the first member a series of photoelectric devices disposed on an axis along a radius of the first member, said guide means extending to a point closer to the hub than the peripheral edge of the second member, and a drive shaft connected to the side of said second member opposite the hub.

2. In a digital encoder, the combination comprising a circular member having a flat surface with a central aperture and an annular flange extending perpendicularly away from said surface, a second circular member having a central boss and a peripheral edge coaxially disposed within the inner surface of the annular flange of said first member, said boss having two surfaces parallel to the flat surface of said member, the flange and peripheral surfaces of said members having confronting bearing tracks, a plurality of bearing balls disposed within said tracks to rotatably interconnect said two members, a code disc support mounted coaxially on one surface of the circular member with a surface parallel to the flat surface of said first member, said disc support extending beyond the flat surface of said first member, a code disc coaxially mounted on the surface of the code disc support parallel to said first member, a linear array of photoelectric devices, means for mounting the array of photoelectric devices on the circular member along a radius thereof, and means for adjusting the position of each said device transversely of said radius.

3. A digital encoder comprising the elements of claim 1 in combination with an opaque plate mounted on the array of photocells having a linear slit confronting the photocells and disposed on a radius of the flange.

4. An analog-to-digital encoder comprising a first member having a circular plate shaped portion and a cylindrical rim extending normally from the periphery of the plate shaped portion, a second circular member parallel to the plate shaped portion of the first member located within the rim, the peripheral edge of the second member and the adjacent rim having confronting concave bearing tracks, a plurality of balls disposed within said tracks to rotatably interconnect said two members, means for coaxially mounting a code disc on the second member, and means for mounting a linear array of equally spaced photocells on the surface of the first member remote from the rim, said means positioning the photocell array on a radius of the rim in one of a plurality of fixed positions spaced from the axis of the rim by different distances.

5. An analog-to-digital encoder comprising the elements of claim 4 in combination with a housing having a plate on one surface with a circular opening therein approximately equal in diameter to the diameter of the first member of the encoder, the first member being mounted within the opening on a common plane with the plate of the housing, and a code disc coaxially mounted on the second member of the encoder, the photocell array being mounted in a position of the mounting means remote from the axis of the rim to confront the code disc and partially abutting the plate of the housing.

References Cited in the file of this patent

UNITED STATES PATENTS

| | | |
|---|---|---|
| 1,453,366 | Rockwell | May 1, 1923 |
| 1,824,604 | Lederle | Sept. 22, 1931 |
| 1,997,903 | Hackethal | Apr. 16, 1935 |
| 2,131,028 | Goodsell | Sept. 27, 1938 |
| 2,714,204 | Lippel | July 26, 1955 |
| 2,747,797 | Beaumont | May 29, 1956 |
| 2,749,538 | Cooper | June 5, 1956 |
| 2,754,502 | Dickinson | July 10, 1956 |
| 2,765,459 | Winter | Oct. 2, 1956 |
| 2,859,432 | Spaulding | Nov. 4, 1958 |
| 2,860,326 | Walton | Nov. 11, 1958 |

UNITED STATES PATENT OFFICE
CERTIFICATE OF CORRECTION

April 25, 1961

Patent No. 2,981,844

Errett C. Broxon

It is hereby certified that error appears in the above numbered patent requiring correction and that the said Letters Patent should read as corrected below.

Column 5, line 8, for the claim reference numeral "1" read -- 2 --.

Signed and sealed this 14th day of November 1961.

(SEAL)
Attest:

ERNEST W. SWIDER
Attesting Officer

DAVID L. LADD
Commissioner of Patents
USCOMM-DC